(No Model.) 2 Sheets—Sheet 1.
G. H. McGUIRE.
RAILWAY TIME INDICATOR.
No. 539,285. Patented May 14, 1895.
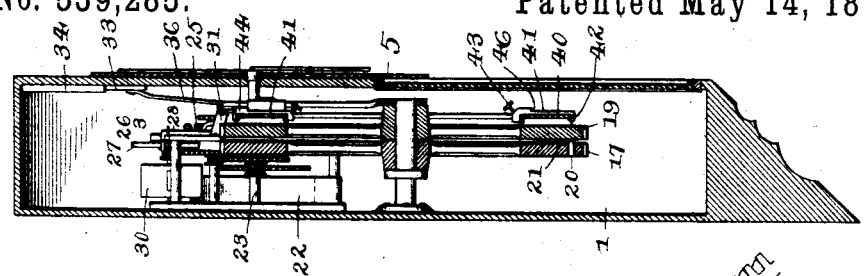
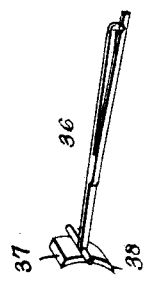
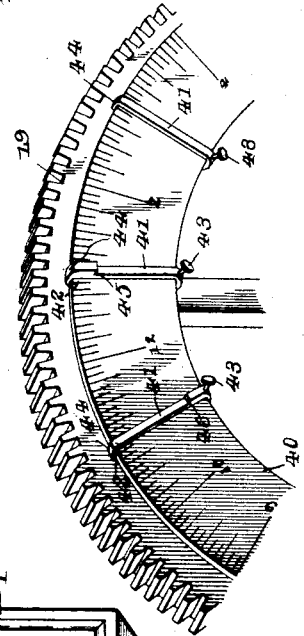
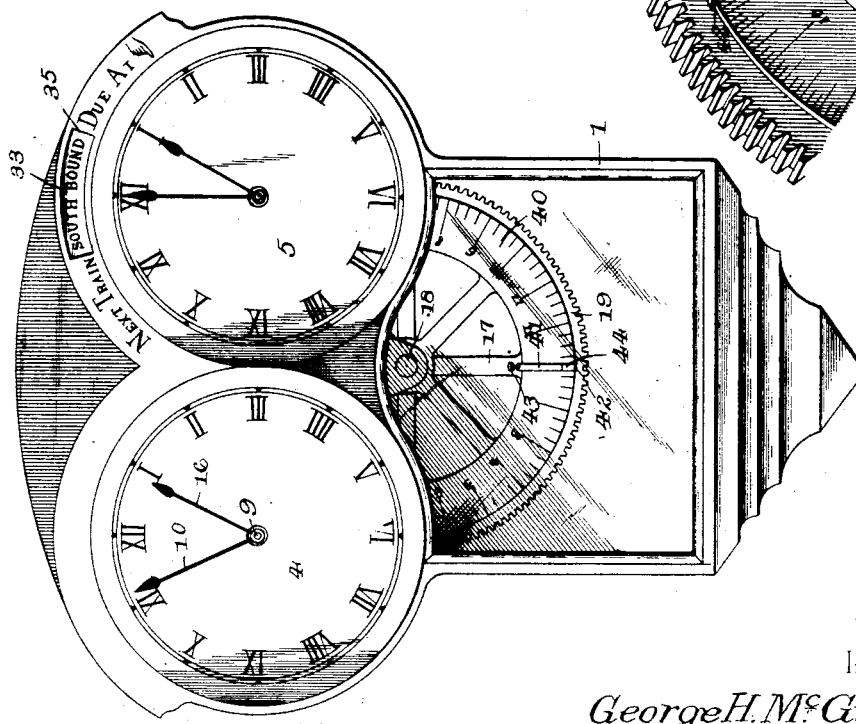
Witnesses
Chas. A. Ford
Inventor
George H. McGuire,
By his Attorneys.

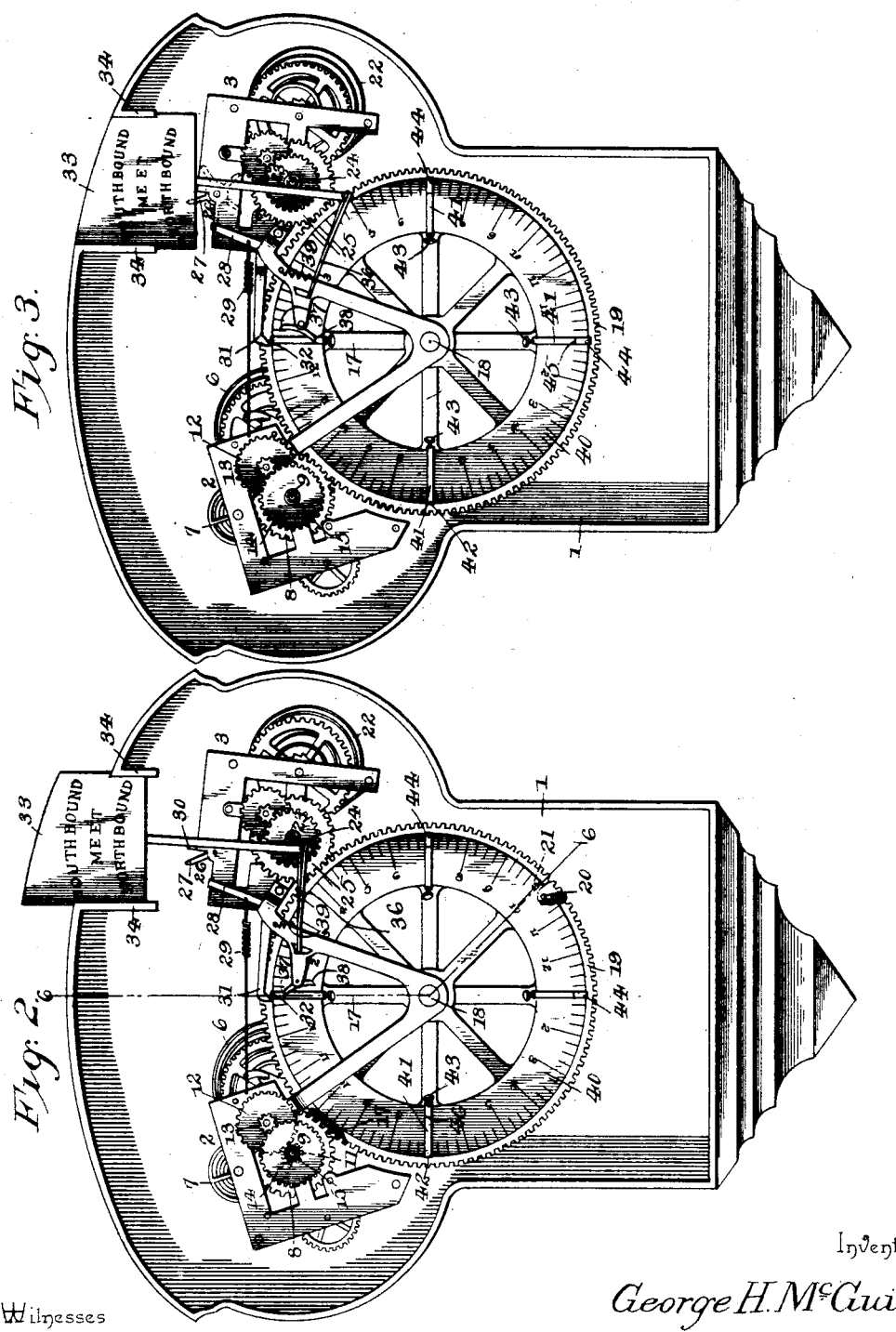

UNITED STATES PATENT OFFICE.

GEORGE H. McGUIRE, OF ELLIJAY, GEORGIA.

RAILWAY TIME-INDICATOR.

SPECIFICATION forming part of Letters Patent No. 539,285, dated May 14, 1895.

Application filed November 24, 1894. Serial No. 529,831. (No model.)

*To all whom it may concern:*

Be it known that I, GEORGE H. McGUIRE, a citizen of the United States, residing at Ellijay, in the county of Gilmer and State of Georgia, have invented a new and useful Railroad Indicating-Clock, of which the following is a specification.

My invention relates to an indicating clock designed for use in railroad depots and stations, and it includes a clock having an ordinary dial and an adjacent indicating mechanism controlled by the clock mechanism to show the time of the arrival and the direction of movement of the trains which successively approach or pass through a given point.

Further objects and advantages of the invention will appear in the following description, and the novel features thereof will be particularly pointed out in the appended claims.

In the drawings, Figure 1 is a front view of an indicating-clock embodying my invention. Fig. 2 is a similar view with the dial-plate omitted and showing the parts arranged to indicate a north-bound train. Fig. 3 is a similar view showing the parts arranged to indicate a south-bound train. Fig. 4 is a detail view of the intermittently-operated wheel. Fig. 5 is a similar view of the lever which communicates motion to the direction-indicator. Fig. 6 is a vertical section on the line 6 6 of Fig. 2.

Similar numerals of reference indicate corresponding parts in all the figures of the drawings.

1 designates a case which may be of any preferred form to contain the clock and indicating mechanisms, 2 and 3, and 4 and 5 represent the dials, respectively, of the clock and indicating mechanisms, said dials being arranged side by side.

A description in detail of the clock-mechanism is unnecessary, for the reason that any preferred or well-known construction may be employed, the same receiving its motion from either a spring or weight and having its escapement controlled by either a pendulum or a hair spring and balance wheel, but in the drawings I have shown a simple form of clock-mechanism provided with a main spring 6, a balance-wheel 7 and a pinion 8 which is concentric with and secured to the arbor 9 to which is attached the minute hand 10. This pinion receives motion through any suitable train of gears from the main spring or other source of motion and, through a spur-pinion 11 also fixed to said arbor, communicates motion through the spur-gear 12, pinion 13 and spur-gear 14 to the sleeve 15 which is loosely mounted upon said arbor and is adapted to carry the hour hand 16. The means for communicating motion from the arbor to the sleeve may be of any other preferred construction and therefore it will be seen that the essential feature of this part of the mechanism is that the pinion 8 is fixed to and carried by the arbor from which the hands of the clock derive motion. This pinion 8 meshes with a continuously moving gear-wheel 17, which is made of such diameter with relation to the pinion 8 as to make one complete revolution during a certain prescribed period, as for instance twenty-four hours. This large gear is mounted upon a post or shaft 18 and adjacent to the plane thereof and mounted upon the same post or shaft is an intermittently moving gear-wheel 19, the continuously moving gear-wheel being provided with a stud or pin 20 to engage the stud or pin 21 on the intermittently moving gear-wheel and thus communicate motion to the latter.

The indicating-mechanism includes a train of gears corresponding in general respects with that embodied in the above described clock-mechanism and may also be varied as above stated in connection with clock-mechanism to receive motion from any preferred source. The mechanism shown in the drawings receives motion from a main spring 22 and motion is communicated through a suitable train of gears to a hand-arbor 23 from which motion is communicated through another set of gears to the sleeve 24 which is mounted upon the arbor, said arbor being fitted with a minute hand and the sleeve with an hour hand similar to those employed in connection with the clock-mechanism and adapted to traverse the dial 5. Secured to the arbor 23, and hence receiving motion therethrough from the main-spring is a pinion 25, which meshes with the teeth of the intermittently moving gear-wheel and thereby communicates rotary motion to said wheel. The indicator-mechanism is not provided with an escapement device as described in connection with the clock-mechanism, but is provided with a brake-wheel 26 preferably having a rotary arm or arms 27 which are adapted to be engaged by a stop or brake-lever 28, when said lever is moved in opposition to the spring 29 which normally holds it out of engagement with the brake-wheel. In order to prevent a too rapid movement of the indicator-mechanism when released by the brake-mechanism, I prefer to employ a governing fan 30, or a similar governing device, and in the construction illustrated, this fan is attached to the spindle of the brake-wheel.

The stop- or brake-lever, above mentioned, is provided with an arm 31 having a beveled or cam face 32, and the intermittently moving gear-wheel is provided with one or more projections which are adapted to engage said beveled or cam face and thus throw the stop or brake-lever into operative relation with the brake-wheel. This checks the motion of the intermittently moving wheel and the brake device maintains the parts at rest until the pin or stud on the continuously moving wheel encounters the pin or stud on the intermittently moving wheel and, by communicating forward motion to the latter, pushes the projection which is in engagement with the beveled or cam face of the stop lever beyond such beveled or cam face and thus out of engagement with the lever. This releases the brake-wheel and therefore allows the intermittently moving-wheel to be turned forward by means of its actuating-spring until another projection on said intermittently moving-wheel again throws the stop or brake-lever into operative relation with the brake-wheel.

It will be understood that when the projection on the intermittently moving wheel is forced beyond the beveled or cam face of the stop-lever, by the motion communicated to said wheel from the continuously moving-wheel, said lever is immediately thrown to its inoperative position, or out of engagement with the brake-wheel, by means of the retracting spring attached to the stop-lever.

From the above description it will be understood that by placing the projections on the intermittently moving-wheel at intervals corresponding with the intervals of time between two trains, said intermittently moving wheel being of equal diameter with the continuously moving wheel, (or holding such relation to the pinion which engages with said intermittently moving-wheel as that described in connection with the continuously moving-wheel, and the pinion from which it receives motion,) it will be seen that when the intermittently moving-wheel is released the indicating-mechanism will operate to turn the indicating hands through a distance corresponding with the interval of time before the next succeeding train, said mechanism being checked (when the time of said succeeding train is indicated on the dial 5 by the hands traversing such dial), by the engagement of the succeeding projection on the intermittently moving-wheel with the beveled or cam face of the stop-lever. Therefore, by disposing of the projections upon the intermittently moving-wheel at intervals corresponding with the intervals of time between the several trains which reach a given point during a period of twenty-four hours, it will be seen that as soon as the time of a train has passed the indicating-mechanism will be released, and the indicating hands will move to the schedule time of the next train to arrive. By a comparison of the clock dial with the indicator dial an observer can see at a glance the time at which the next train is due and the interval of time which must elapse before it is due.

In order to indicate the direction of movement of the several trains, I employ an auxiliary device consisting of a slide or shutter 33, mounted in a guide 34 within the casing and contiguous to an opening 35 which may be and preferably is arranged above the indicating dial, and a slide-operating lever 36 connected to the slide or shutter and arranged in a position to be engaged and receive motion from another series of projections on the intermittently moving-wheel. This slide operating lever, in the construction illustrated, is provided with opposite beveled ears 37 and 38, and when the upper ear is engaged the slide is elevated and when the lower ear is engaged the slide is lowered. This slide carries a card bearing words indicating direction of movement, as "North-bound," "South-bound," "East-bound," "West-bound;" and when the slide operating-lever is engaged by a projection, which must be so placed as to come into operative position when the indicating-mechanism is stopped to show a given time, the slide is moved to expose those words which indicate the direction of movement of the train whose time of arrival is shown on the indicating dial. In the construction illustrated, I have shown the slide provided with the words "North-bound" and "South-bound" and the intermediate word "Meet," and the slide is held in position to expose said word "Meet" by means of a spring 39. Thus when the intermittently moving-wheel, which for convenience I will term an indicator-wheel, is not provided at a certain point with a projection to engage and operate the slide-lever, said slide-lever will be held by the spring in a position to expose this word "Meet," and hence indicate that the north and south-bound trains are due to meet at the time shown by the indicator.

In order to provide for easy and accurate adjustment of projections, such as have been above mentioned, upon the indicator-wheel, I provide said wheel with a false rim or hour plate 40, which is spaced from the main rim of the wheel and is marked to indicate the twenty-four hours and the intervening minutes, and the projections are carried by clamps 41, provided at their outer ends with notches or hooks 42, to engage the outer edge of the false rim or hour plate and at their inner ends with set-screws 43 to engage the inner edge of said rim or plate. The projections for engaging the beveled or cam face of the stop or brake-lever are shown at 44, at the outer ends of the clamps, and in the construction illustrated are integral with said clamps and consist of the outer portions thereof, while the projections for engagement with the ears of the slide operating lever consist of shoulders formed on said clamps, the projections for engaging the upper ear of said lever being shown at 45 and the projections for engaging the lower ear being shown at 46.

While I have described this indicator-mechanism as applied to a railroad clock, and have shown that it is adapted for use in showing the times and directions of movement of scheduled trains, it is obvious that it may be used with equal effect in many other capacities where an indicator-mechanism capable of a plurality of positions to indicate different conditions or things is to be operated or set automatically, the settings being successive, although predetermined, and being controlled by a regulating mechanism having a continuous movement, to mark the time or other stated periods.

The operation will be understood from the foregoing description, and it will be obvious that various changes in the form, proportion and the minor details of construction may be resorted to without departing from the spirit or sacrificing any of the advantages of this invention.

Having described my invention, I claim—

1. The combination with an indicating device, of an intermittently moving part or member operatively connected with the indicating device, a continuously moving part or member receiving a constant impulse, and means whereby the continuously moving part or member imparts positive motion at intervals to the intermittently moving part or member, to successively adjust the indicating device, substantially as specified.

2. The combination with an indicating device, of an intermittently moving part or member operatively connected with the indicating device and moving in a constant direction, a brake-device controlled by the intermittently moving part or member and adapted to check the movement thereof, a continuously moving part or member operating in a constant direction, and means whereby said continuously moving part or member imparts motion at intervals to the intermittently moving part or member and thereby releases said intermittently moving part or member from the brake device, substantially as specified.

3. The combination with an indicating device, of an intermittently moving part or member operatively connected with the indicating device and receiving a constant impulse, a brake-device including a brake-lever provided with a beveled or cam face arranged in the path of spaced projections on the intermittently moving part or member, a yielding device, as a spring, for normally holding the brake-lever in its retracted or inoperative position, a continuously moving part or member, and means whereby the continuously moving part or member imparts a forward movement to the intermittently moving part or member, at intervals, to carry the projection on the intermittently moving part or member beyond the beveled or cam face of the brake-lever and hence out of operative relation therewith, substantially as specified.

4. The combination with an indicating device, of an intermittently moving part or member operatively connected with the indicating device and receiving a constant impulse, a brake-device including a brake-lever having a beveled or cam face, spaced projections on the intermittently moving part or member to engage said beveled or cam face of the brake-lever, the projections including clamps being adjustably mounted upon said part or member whereby the intervals therebetween may be altered, and means for actuating the brake-lever at intervals to release the intermittently moving part or member, substantially as specified.

5. The combination with an indicating device, of an intermittently moving part or member operatively connected with the indicating device and receiving a constant impulse in a uniform direction, a brake-device provided with a retracting spring and having a beveled or cam face arranged in the path of projections on the intermittently moving part or member, said projections being adapted to successively engage the beveled or cam face of the brake-lever to move the latter into operative position and check the movement of said part or member, a continuously moving part or member operating in a uniform direction parallel with that of the intermittently moving part or member, and studs or pins carried by the intermittently and continuously moving parts or members, that on the continuously moving part or member being adapted to engage that on the intermittently moving part or member to give the last named part or member a forward impulse and thereby disengage its projection from the beveled or cam face of the brake-lever, substantially as specified.

6. The combination with an indicating device, of an intermittently moving part or member operatively connected with the indicating device, means for imparting a constant impulse in a uniform direction to said part or member, a rotary fan governor for controlling said means, a pivotal lever having an arm arranged in operative relation with said governor and a second arm provided with an inclined face arranged contiguous to the intermittently moving part or member, projections carried by said part or member to engage the inclined face of the lever and throw the other arm of the latter into engagement with the governor, and a continuously moving part or member operating parallel and in a uniform direction with the intermittently moving part or member and provided with a stud or pin to engage a similar stud or pin on the intermittently moving part or member to impart an advance movement to the latter sufficient to carry the projection thereon beyond the point of engagement with the inclined face of the lever, substantially as specified.

7. The combination with an indicating device, of an intermittently moving part or member operatively connected with the indicating device and receiving a constant impulse in a uniform direction, means including a rotary governor for imparting said impulse to the intermittently moving part or member, a lever having a cam face arranged in the path of projections on the intermittently moving part or member and provided with means for engaging said governor, a spring for normally holding the lever with its cam face in the path of said projections, and a continuously moving part or member adapted at intervals to impart forward motion to the intermittently moving part or member to carry its projections successively beyond the cam face of the lever by forcing the latter out of their path against the tension of the spring by which the lever is actuated, substantially as specified.

8. The combination with an indicating device, of an intermittently moving part or member operatively connected with the indicating device and receiving a constant impulse in a uniform direction, a graduated rim spaced from and carried by said part or member and having exposed inner and outer edges, clamps arranged upon said rim and engaging the inner and outer edges thereof, said clamps having locking devices to secure them at the desired adjustment, an indicating slide, and a lever operatively connected with said slide and provided with ears adapted to be engaged, respectively, by shoulders arranged at different points on said adjustable clamps, substantially as specified.

9. The combination with a slide, of an intermittently moving part or member, means for imparting an intermittent motion to said part or member, a lever operatively connected with the said slide, and projections carried by said intermittently moving part or member and adapted to engage the lever successively to adjust the said slide, substantially as specified.

10. The combination with a slide capable of a plurality of positions, of a lever having a plurality of ears, means for holding said lever in an intermediate position, an intermittently moving part or member provided with spaced projections adapted for engagement with the ears of said lever to move the lever in opposite directions from said intermediate point, and means for imparting an intermittent movement to the said part or member, substantially as specified.

11. The combination with an indicating device, having pointers capable of motion in a uniform direction, and a slide arranged in operative relation with an inspection opening, whereby only a portion of the slide is visible at a time, of an intermittently moving part or member operatively connected with the pointers of said indicating device, a lever connected to the slide and having ears arranged in the path of projections on the intermittently moving part or member and means for imparting an intermittent movement to said part or member, substantially as specified.

In testimony that I claim the foregoing as my own I have hereto affixed my signature in the presence of two witnesses.

GEORGE H. McGUIRE.

Witnesses:
ADOLPHUS T. LOGAN,
LODWICK G. EDWARDS.